United States Patent Office 3,463,122
Patented Aug. 26, 1969

3,463,122
PROCESS FOR DELAYED PRODUCTION OF JAPANESE BEETLE LARVAE
Grant St. Julian, Peoria, Ill., assignor to the United States of America as represented by the Secretary of Agriculture
No Drawing. Filed Sept. 25, 1967, Ser. No. 670,376
Int. Cl. A01k 67/04
U.S. Cl. 119—6                                                 1 Claim

ABSTRACT OF THE DISCLOSURE

Storage of fertile Japanese beetle eggs for as long as 3 weeks to provide an out-of-season supply of newly hatched larvae is made practical by storing the freshly collected eggs at 3–5° C. in 0.85% NaCl solution for the desired period and then incubating the washed eggs at ca 26° C. to induce the hatching of the surviving viable eggs.

DETAILED DESCRIPTION OF THE INVENTION

This invention relates to a process for delaying the hatching of Japanese beetle eggs for an appreciable period so as to subsequently obtain large numbers of freshly hatched normal larvae at seasons during which larvae are not found in the field.

Many thousands of Japanese beetle larvae are used annually at this and other laboratories in research towards the in vitro production of *Bacillus popilliae* spores for use as a biological insecticide.

The Japanese beetle larvae, which in their natural habitat are found only in the spring and in the fall, provide hemolymph for research on the growth and sporulation factors required by the milky disease pathogen, *Bacillus popilliae*. The larvae are also used for testing the infectivity of *B. popilliae* strains and as a source of authentic spores for studies on the physiology and cytology of the milky disease organism.

The larvae that are collected in the field include many that are diseased or that cannot be used for research because of nonuniform age and size. Thus, laborious sorting is required, which is not the case when stored viable eggs are hatched at almost the same moment by simultaneous incubation at a hatching temperature.

Thus, the principal object of the present invention is a process for storing the highly sensitive and easily killed *Popillia japonica* eggs in a nonhatching but relatively nontoxic environment for a fairly prolonged period, i.e., on the order of approximately 3 weeks, so that an immediately subsequent incubation of the washed eggs will induce a highly uniform larvation in about 50 percent of the eggs, thus lessening or avoiding the very undesirable summer interruptions of the pertinent research. It is understood, of course, that the avoidance of the summer gap by the herein disclosed temporary suppression of larvation is rendered more complete by the presence of recently captured colonies of adult *P. japonica* beetles that were housed in polymethacrylate cages that contained moist soil, the cages being exposed to 15.5-hour of artificial illumination per day, the approximately 1000 adult beetles per cage being fed on halved apples that were supplemented variously with carrots, soybean leaves, lettuce, and horseweed. Depending on whether the adult insects were field specimens or whether they were the highly uniform laboratory-bred Japanese beetles, the eggs were recovered by carefully sifting the soil after virtually all the adults had died (average of 21 days) or also at selected intervals somewhat prior thereto.

Example 1

Adult *P. japonica* insects that had been collected from soybean plants in eastern Illinois and western Indiana were caged as described above. The eggs harvested therefrom were placed in corked test tubes (10 eggs per tube) containing several milliliters of 0.85% saline solution, and the tubes were then refrigerated at 3–5° C. At intervals of several days a tube from each lot of eggs was removed from storage and after the eggs were rinsed with distilled water they were placed on filter paper situated on a 2% aqueous agar solution in a petri dish, which was then incubated at 26° C. for a maximum of 23 days to permit the hatching of the 1st instar larvae.

In replicate experiments it was found that all of the eggs that had been stored as above for from 1 through 6 days hatched into normal larvae and that the percentage fell to 70% with eggs that had been suppressed for either 11 days or 14 days. Following 21 days of storage only 40% of the eggs hatched, and the latter value was halved after 28 days of storage. Thus, it is apparent that suppression periods exceeding 3 weeks are generally impractical for the intended purpose, although under certain circumstances a 20% production of larvae may permit the advancement or completion of some particular research or test.

The identity of the laboratory-reared larvae with the disease-free larvae captured in the field was shown not only by identical larval instar growth changes but was also verified by an essentially identical susceptibility to the development of Japanese beetle milky disease following injection with *B. popilliae* NRRL B–2309 organisms. Also, there were no differences in the morphology by phase contrast microscopy of the spores from the diseased native and the laboratory reared larvae.

Hatching percentages following identical suppression storages in glycerin or in dilute aqueous sucrose or glucose were distinctly inferior to those with the saline.

A nonexclusive, irrevocable, royalty-free license in the invention herein described, throughout the world for all purposes of the United States Government, with the power to grant sublicenses for such purposes, is hereby granted to the Government of the United States of America.

I claim:
1. A laboratory process for obtaining an appreciably belated, off-season crop of hatched Japanese beetle larvae, said process comprising immersing viable eggs of the Japanese beetle in an 0.85% NaCl solution, maintaining the said solution at 3–5° C. for a period not exceeding about 21 days, rinsing the eggs with distilled water, and incubating the eggs at 26° C. in contact with a 2% agar medium for about 21 days, until the hatching stage whereby at least about 40% of the eggs will have hatched into the desired larvae.

References Cited

UNITED STATES PATENTS

| 1,816,368 | 7/1931 | Fioruzzi | 119—6 |
| 3,230,930 | 1/1966 | Hamamura | 119—6 |

ALDRICH F. MEDBERY, Primary Examiner